US008622586B2

United States Patent
Lee et al.

(10) Patent No.: US 8,622,586 B2
(45) Date of Patent: Jan. 7, 2014

(54) ANTI-GLARE LENS AND TABLE LAMP WITH AN ANTI-GLARE LENS

(75) Inventors: Hsiao-Yi Lee, Zhubei (TW); Tsai-You Chen, Kaohsiung (TW)

(73) Assignee: National Kaosiung University of Applied Sciences, Kaohsiung (TW)

( * ) Notice: Subject to any disclaimer, the term of this patent is extended or adjusted under 35 U.S.C. 154(b) by 248 days.

(21) Appl. No.: 13/241,846

(22) Filed: Sep. 23, 2011

(65) Prior Publication Data

US 2012/0287647 A1 Nov. 15, 2012

(30) Foreign Application Priority Data

May 13, 2011 (TW) .............................. 100116772 A

(51) Int. Cl.
*F21V 3/02* (2006.01)
*F21V 5/04* (2006.01)
*F21S 8/08* (2006.01)

(52) U.S. Cl.
USPC .................... 362/311.02; 362/311.1; 362/327; 362/335; 362/413

(58) Field of Classification Search
USPC ............... 362/311.02, 311.06, 311.09, 311.1, 362/311.11, 327, 329, 413, 414
See application file for complete search history.

(56) References Cited

U.S. PATENT DOCUMENTS

| | | | | | |
|---|---|---|---|---|---|
| 2,215,900 | A | * | 9/1940 | Bitner | 362/309 |
| 2,908,197 | A | * | 10/1959 | Wells et al. | 340/815.76 |
| 3,413,461 | A | * | 11/1968 | Wince | 362/311.09 |
| 5,477,443 | A | * | 12/1995 | Cvek | 362/413 |
| 5,526,190 | A | * | 6/1996 | Hubble et al. | 359/719 |
| 7,401,948 | B2 | * | 7/2008 | Chinniah et al. | 362/326 |
| 7,798,677 | B2 | * | 9/2010 | Huang et al. | 362/309 |
| 8,002,435 | B2 | * | 8/2011 | Laporte | 362/249.02 |
| 8,292,474 | B2 | * | 10/2012 | Ho et al. | 362/335 |
| 2010/0110695 | A1 | * | 5/2010 | Nakamura | 362/311.09 |

* cited by examiner

*Primary Examiner* — Alan Cariaso
(74) *Attorney, Agent, or Firm* — Rabin & Berdo, P.C.

(57) ABSTRACT

A table lamp has a lamp stand, an adjusting arm, a lamp head and an anti-glare lens. The anti-glare lens is mounted on the lamp head and has a body. The body has a bottom, a light entering concave face, a light source region, a total reflection face and a light ejecting convex face. The bottom has a zero axis to divide the bottom equally. The light entering concave face is formed in the body. The light source region is formed in the body. The total reflection face is obliquely formed on and protrudes from the body and is formed with the bottom of the body. An angle between the zero axis and the total reflection face is between 90 and 180 degrees. The light ejecting convex face is formed on the body, is formed with the total reflection face and has at least one curvature.

11 Claims, 17 Drawing Sheets

ANTI-GLARE LENS AND TABLE LAMP WITH AN ANTI-GLARE LENS

BACKGROUND OF THE INVENTION

1. Field of the Invention

The present invention relates to an anti-glare lens and a table lamp with an anti-glare lens, and more particularly to an anti-glare lens and a table lamp with an anti-glare lens that can reduce the glare and can improve the light utilization rate.

2. Description of Related Art

With reference to FIG. 12, a conventional table lamp has a lamp stand 90, an adjusting arm 91, a lamp head 92 and a lens 93. The adjusting arm 91 is connected to and protrudes upwardly from the lamp stand 90 and has a top end. The lamp head 92 is connected to the top end of the adjusting arm 91 and has an inner surface and a luminescence module. The luminescence module is mounted in the inner surface of the lamp head 92, is electrically connected to an external power source and has a luminous element. The lens 93 is mounted on the inner surface of the lamp head 92, is mounted around the luminescence module of the lamp head 92 and has a light entering face and a light ejecting face. The light entering face faces the luminous element of the luminescence module. The light ejecting face is a symmetrically-curved face and is formed around the light entering face of the lens 93 to enable the light of the luminous element to emit out of the lens 93.

According to the symmetrically-curved face of the lens 93, a polar candela distribution plot of the conventional table lamp is shown in FIG. 13, wherein the distributions of the light intensity between angles 0° and 90° are roughly overlapped. In accordance with the illuminance distribution and the light projection state as shown in FIGS. 14 and 15A to 15C, the position of the peak value of the distribution of the light intensity of the conventional table lamp is perpendicular to the lamp head 92. With reference to FIG. 12, a target zone 95 formed by the light of the lamp head 92 on a table is perpendicular to the lamp head 92. Then, a reader needs to adjust the lamp head 92 to move it close to the reader to increase the illuminance for reading. However, when the lamp head 92 is moved close to the reader, the reader may directly face the glare, the reader's eyes may be tired and the shadow may affect reading comfort.

In order to solve the above-mentioned problems, the reader may adjust the angle of the lamp head 92 to lift the lamp head upwardly as shown in FIG. 16, and this will make the peak value of the distribution of the light intensity occur at where light obliquely emits to the reader. Then, the target zone 95 of the lamp head 92 will deviate to the reader to reduce the influence of shadow. However, the reader still feels the glare and the reader's eyes may be tired.

To overcome the shortcomings, the present invention provides an anti-glare lens and a table lamp with an anti-glare lens to mitigate or obviate the aforementioned problems.

SUMMARY OF THE INVENTION

The main objective of the present invention is to provide an anti-glare lens and a table lamp with an anti-glare lens, and more particularly to an anti-glare lens and a table lamp with an anti-glare lens that can reduce the glare and can improve the light utilization rate.

The table lamp in accordance with the present invention has a lamp stand, an adjusting arm, a lamp head and an anti-glare lens. The adjusting arm is connected to the lamp stand. The lamp head is connected to the adjusting arm and has a luminous element. The anti-glare lens is mounted on the lamp head and has a body. The body has a bottom, a front end, a rear end, a light entering concave face, a light source region, a total reflection face and a light ejecting convex face. The bottom is flat and has a zero axis to divide the bottom equally. The light entering concave face is formed in the body. The light source region is formed in the body between the light entering concave face and the bottom of the body. The total reflection face is obliquely formed on and protrudes from the rear end of the body and is formed with the bottom of the body. An angle between the zero axis of the bottom of the body and the total reflection face is between 90 and 180 degrees. The light ejecting convex face is formed from the rear end to the front end of the body, is formed with the total reflection face and has at least one curvature.

Other objectives, advantages and novel features of the invention will become more apparent from the following detailed description when taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENT

Figure 1:
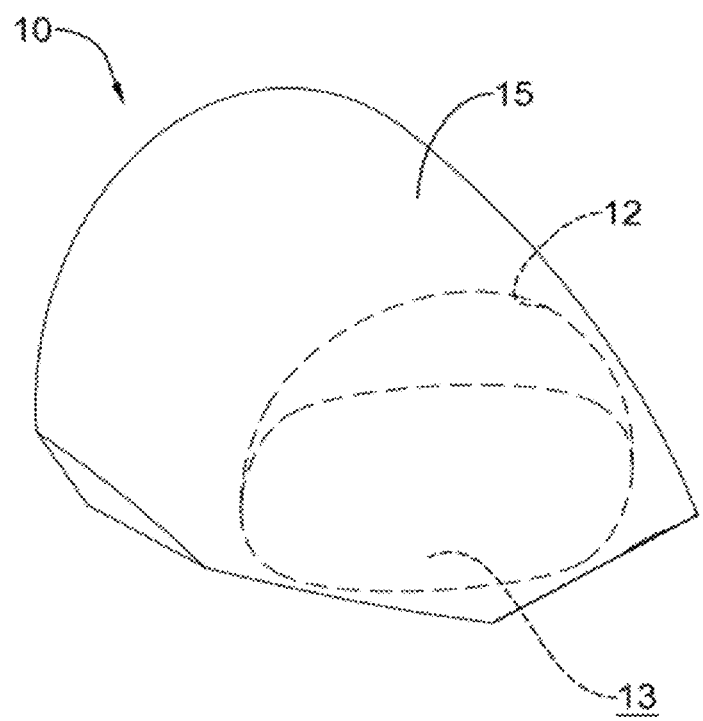
FIG. 1 is a perspective view of an anti-glare lens in accordance with the present invention.
Figure 2:
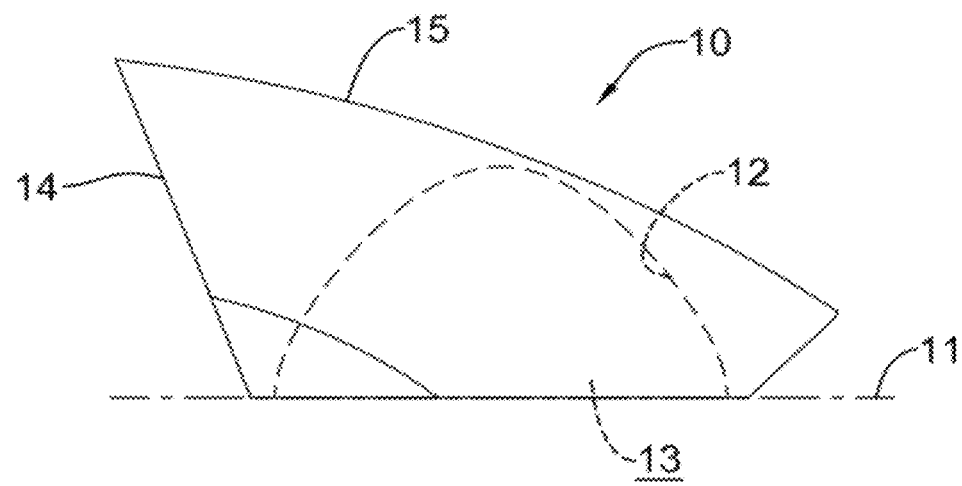
FIG. 2 is a side view of the anti-glare lens in FIG. 1.
Figure 3:
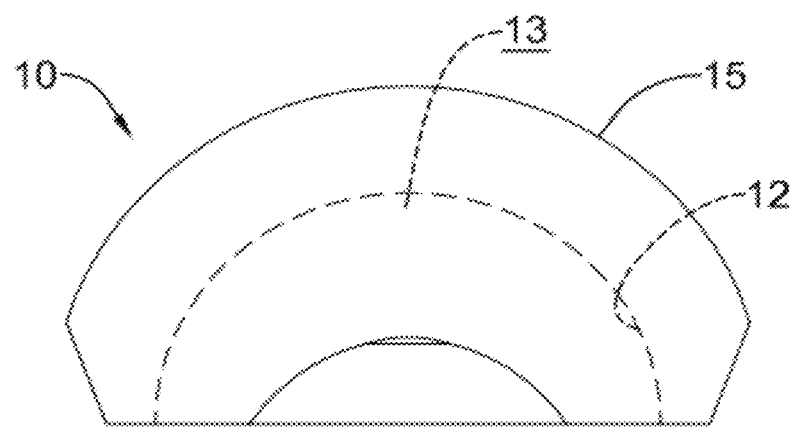
FIG. 3 is a front view of the anti-glare lens in FIG. 1.
Figure 4:
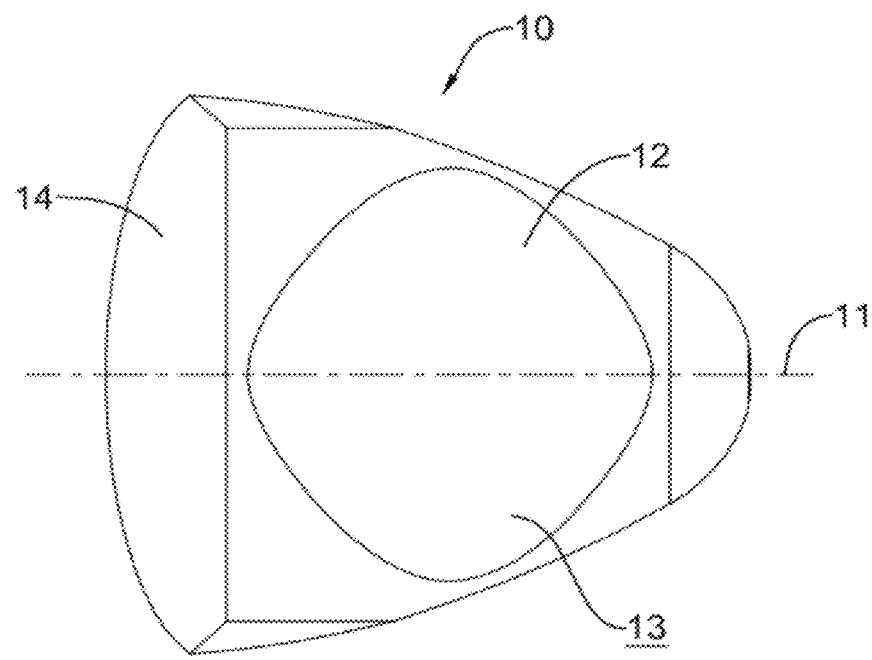
FIG. 4 is a bottom view of the anti-glare lens in FIG. 1.

With reference to FIGS. 1 to 4 and 8, an anti-glare lens in accordance with the present invention comprises a body 10. The body 10 has a bottom, a front end, a rear end, a light entering concave face 12, a light source region 13, a total reflection face 14 and a light ejecting convex face 15. The bottom of the body 10 is flat and has a zero axis 11 to divide the bottom of the body 10 equally. The light entering concave face 12 is formed in the bottom of the body 10 and is divided equally by the zero axis 11 of the bottom of the body 10.

The light source region 13 is formed in the body 10 between the light entering concave face 12 and the bottom of the body 10. The total reflection face 14 is obliquely formed on and protrudes from the rear end of the body 10, is formed with the bottom of the body 10 and is divided equally by the zero axis 11 of the bottom of the body 10. An angle between the zero axis 11 of the bottom of the body 10 and the total reflection face 14 is between 90 and 180 degrees.

The light ejecting convex face 15 is formed from the rear end to the front end of the body 10, is formed with the total reflection face 14 and is divided equally by the zero axis 11 of the bottom of the body 10 and has at least one curvature. Each one of the at least one curvature of the light ejecting convex face 15 has a center of curvature 60 set out of the light source region 13 and close to the rear end of the body 10.

Figure 5:
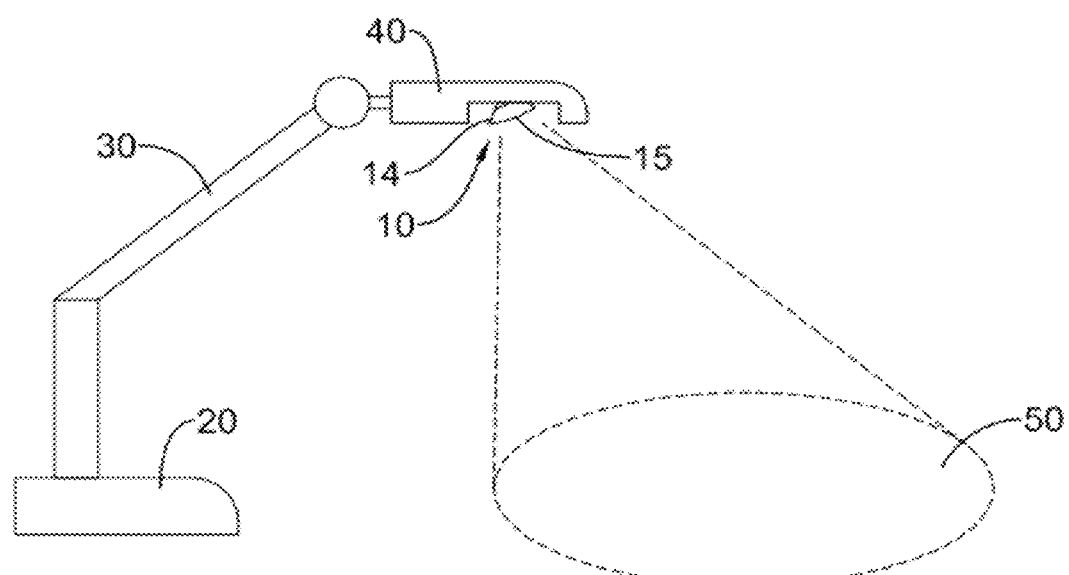
FIG. 5 is a side view of a table lamp with an anti-glare lens in accordance with the present invention.
Figure 6:
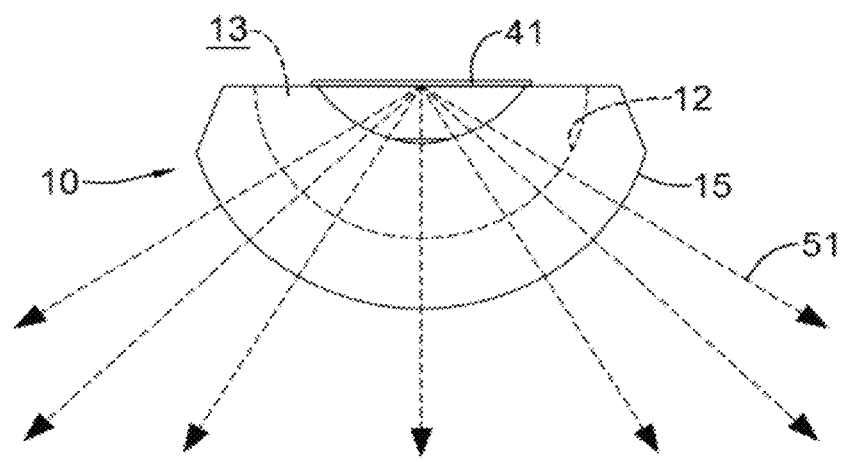
FIG. 6 is an operational front view of the table lamp in FIG. 5.

With reference to FIGS. 5 and 6, a table lamp with an anti-glare lens in accordance with the present invention comprises a lamp stand 20, an adjusting arm 30, a lamp head 40 and the above-mentioned anti-glare lens.

The lamp stand 20 has a top. The adjusting arm 30 is connected to the lamp stand 20 and has a lower end and an upper end. The lower end of the adjusting arm 30 is connected to the top of the lamp stand 20. The lamp head 40 is connected to the upper end of the adjusting arm 30 and has an inner surface and a luminous element 41. The luminous element 41 may be a light-emitting diode, is mounted on the inner surface of the lamp head 40 and can emit a light 51. The bottom of the body 10 of the anti-glare lens is mounted on the inner surface of the lamp head 40 to enable the light source region 13 of the body 10 of the anti-glare lens to be mounted around the luminous element 41 of the lamp head 40.

Figure 7:
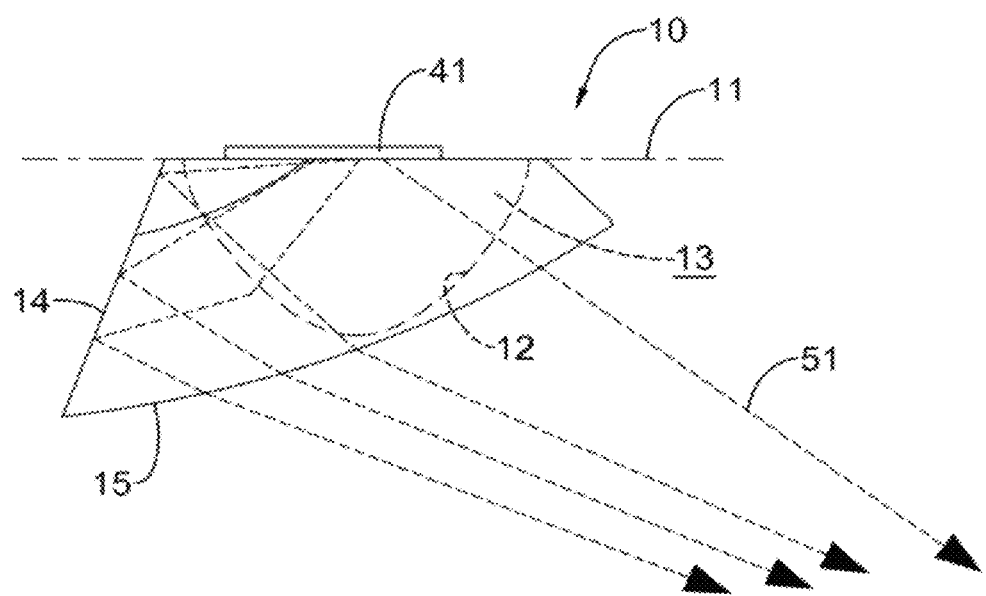
FIG. 7 is an operational side view of the table lamp in FIG. 5.
Figure 8:
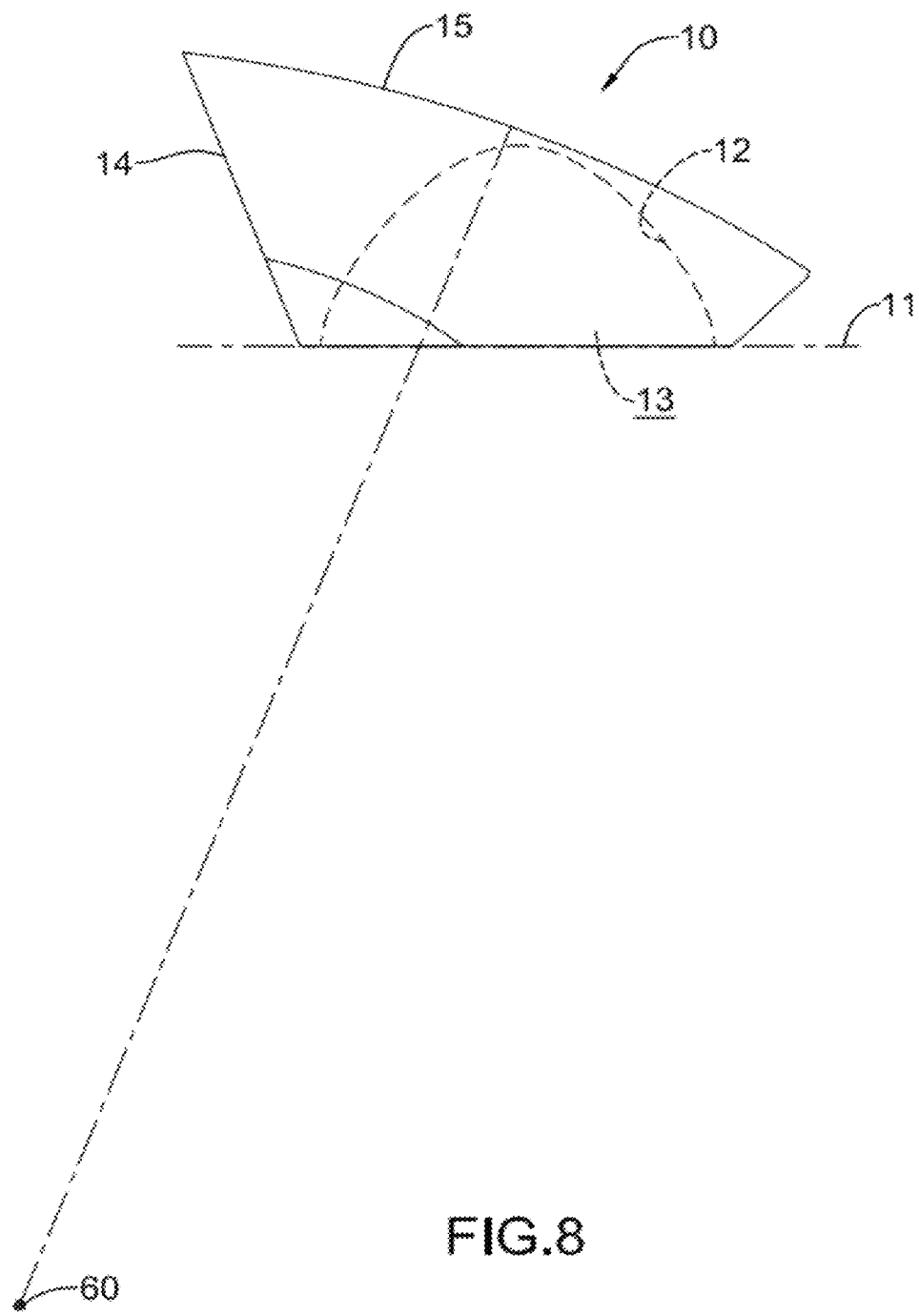
FIG. 8 is a side view of the anti-glare lens of the table lamp in FIG. 5.

In use, with reference to FIGS. 6 and 7, the light 51 of the luminous element 41 emits into the light source region 13 and firstly reflects from the light entering concave face 12. A part of the light 51 of the luminous element 41 emits out of the body 10 of the anti-glare lens via the light ejecting convex face 15. Another part of the light 51 of the luminous element 41 emits to the total reflection face 14. When the part of the light 51 of the luminous element 41 emits to the total reflection face 14, the angle of incidence of the light 51 is larger than the critical angle of the light 51. Then, the part of the light 51 totally reflects to the light ejecting convex face 15.

When the part of the light 51 of the luminous element 41 emits to the light ejecting convex face 15, due to the curvature scheme of the light ejecting convex face 15, the part of the light 51 of the luminous element 41 is secondary reflected by the light ejecting convex face 15 and emits to the front end of the body 10. Therefore, if the lamp head 40 is adjusted to a horizontal position, the peak value of the distribution of the light intensity of the light 51 does not occur at where perpendicular to the lamp head 10 and moves away from the lamp stand 20. Then, a target zone 50 formed by the light 51 of the luminous element 41 on a table is obliquely moved away from the lamp stand 20 as shown in FIG. 5.

Figure 9:
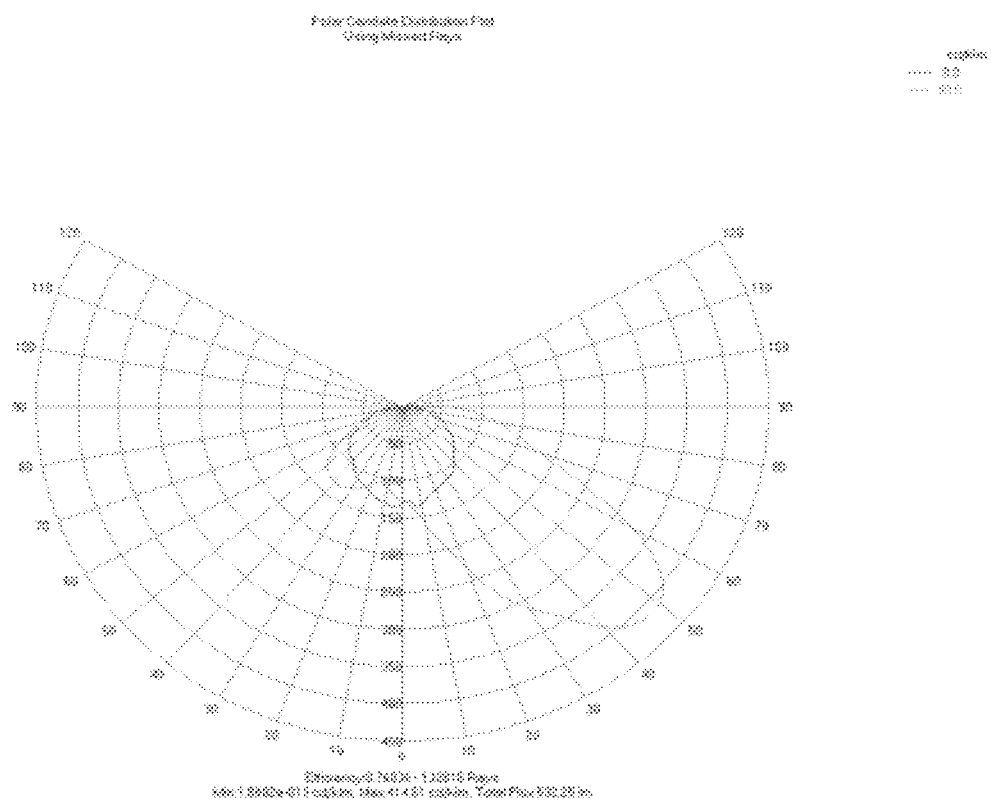
FIG. 9 is an operational diagram of a polar candela distribution plot of a lamp head of the table lamp in FIG. 5.
Figure 10:
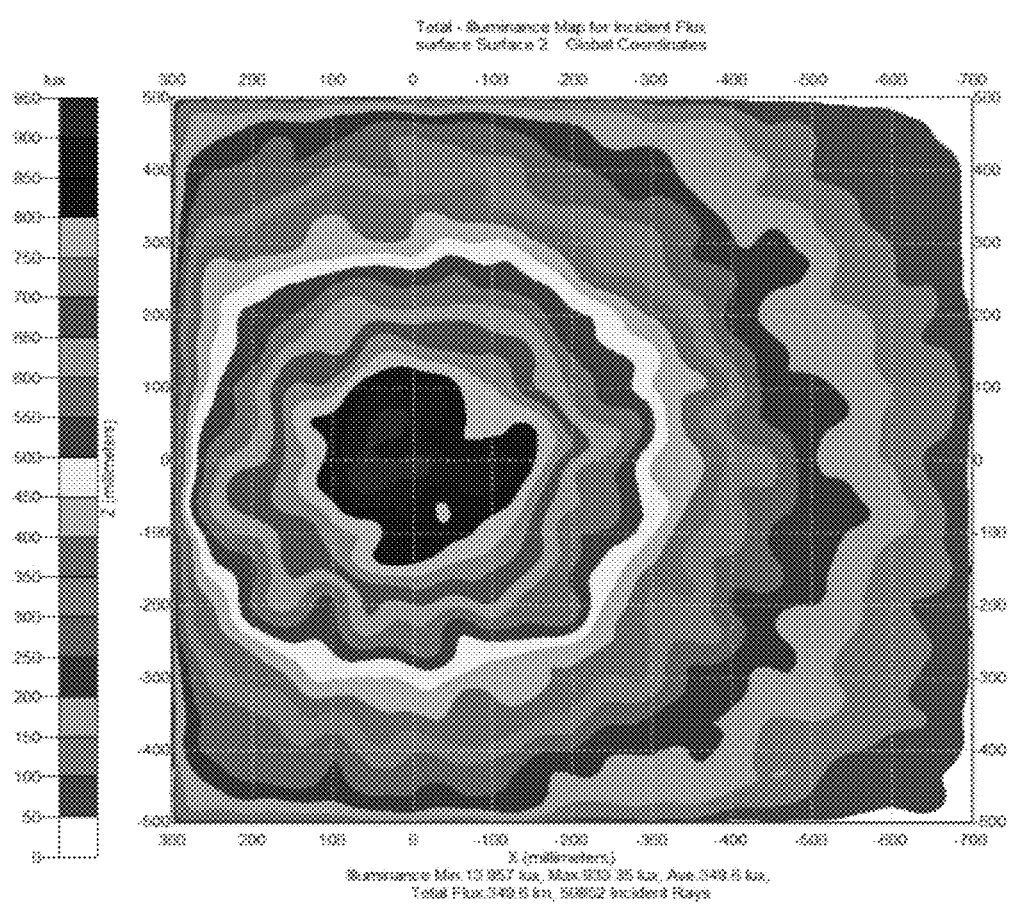
FIG. 10 is an operational diagram of a distribution of the light intensity of a lamp head of the table lamp in FIG. 5.

Furthermore, a polar candela distribution plot of the table lamp is shown in FIG. 9, the distributions of the light intensity of the light 51 of the luminous element 41 between angles 0° and 90° are symmetrized on the zero axis 11 and are not overlapped. The distribution of the light intensity of the light 51 of the luminous element 41 moves toward the direction of 50 degrees. With reference to FIG. 10, the position of the peak value of the distribution of the light intensity of the light 51 of the luminous element 41 is not perpendicular to the lamp head 40 and moves away from the lamp stand 20.

Figure 11A:
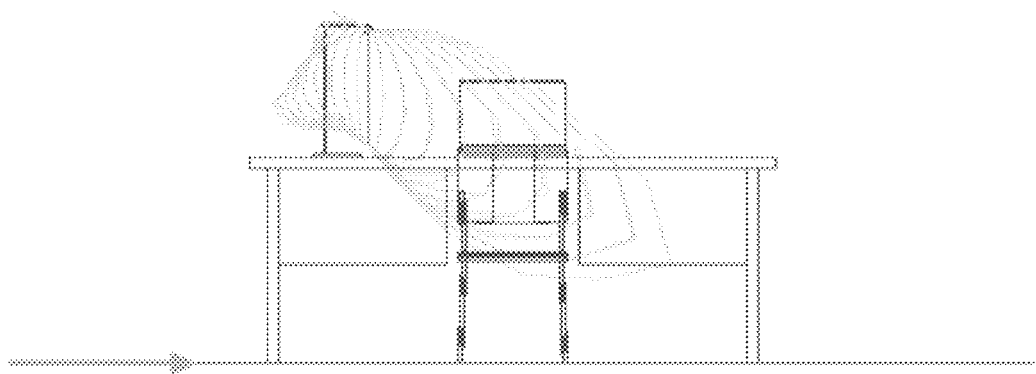
FIGS. 11A, 11B and 11C are operational diagrams of a light projection state of a lamp head of the table lamp in FIG. 5.
Figure 11B:
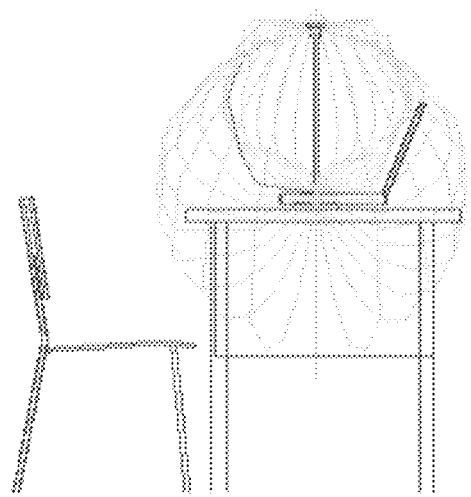
Figure 11C:
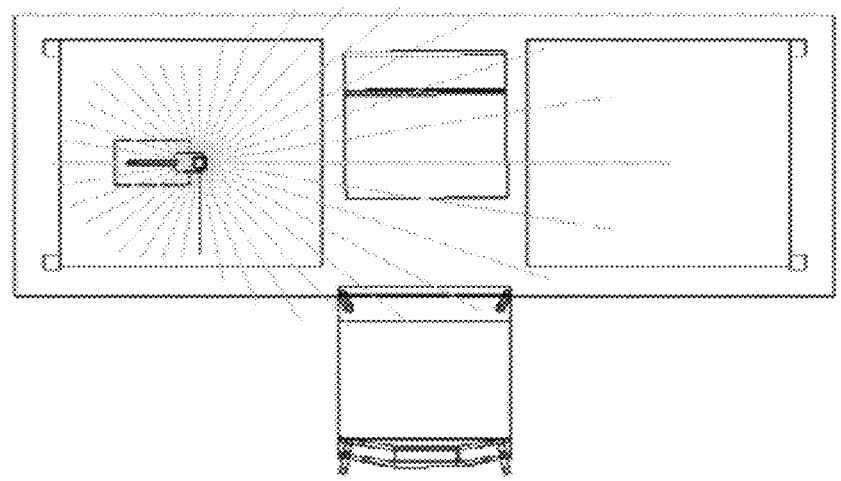
Figure 12:
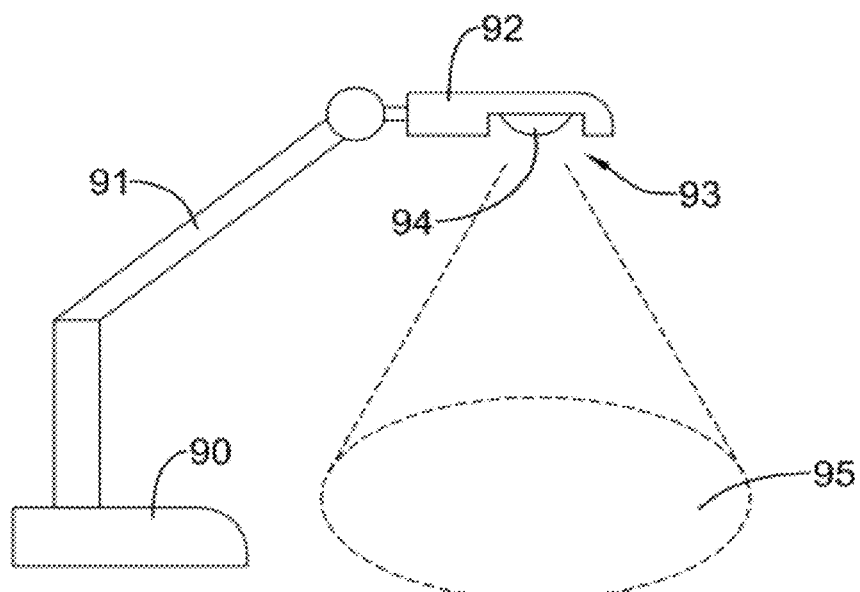
FIG. 12 is a side view of a table lamp in accordance with the prior art.
Figure 13:
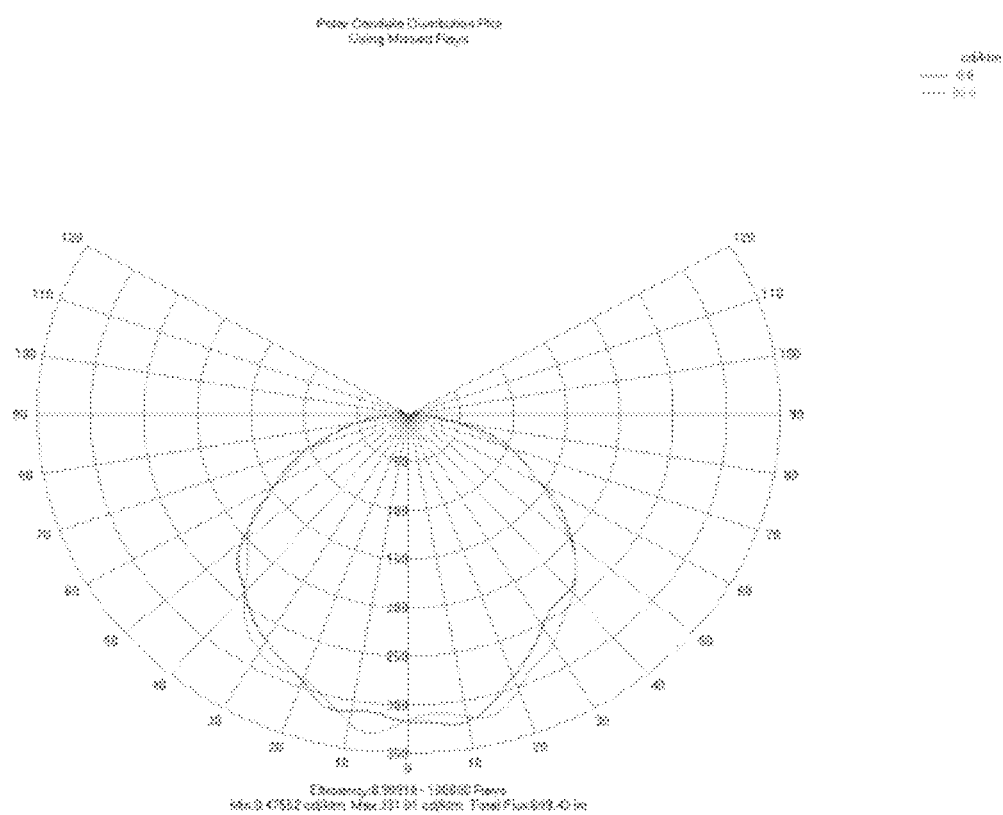
FIG. 13 is an operational diagram of a polar candela distribution plot of a lamp head of the table lamp in FIG. 12.
Figure 14:
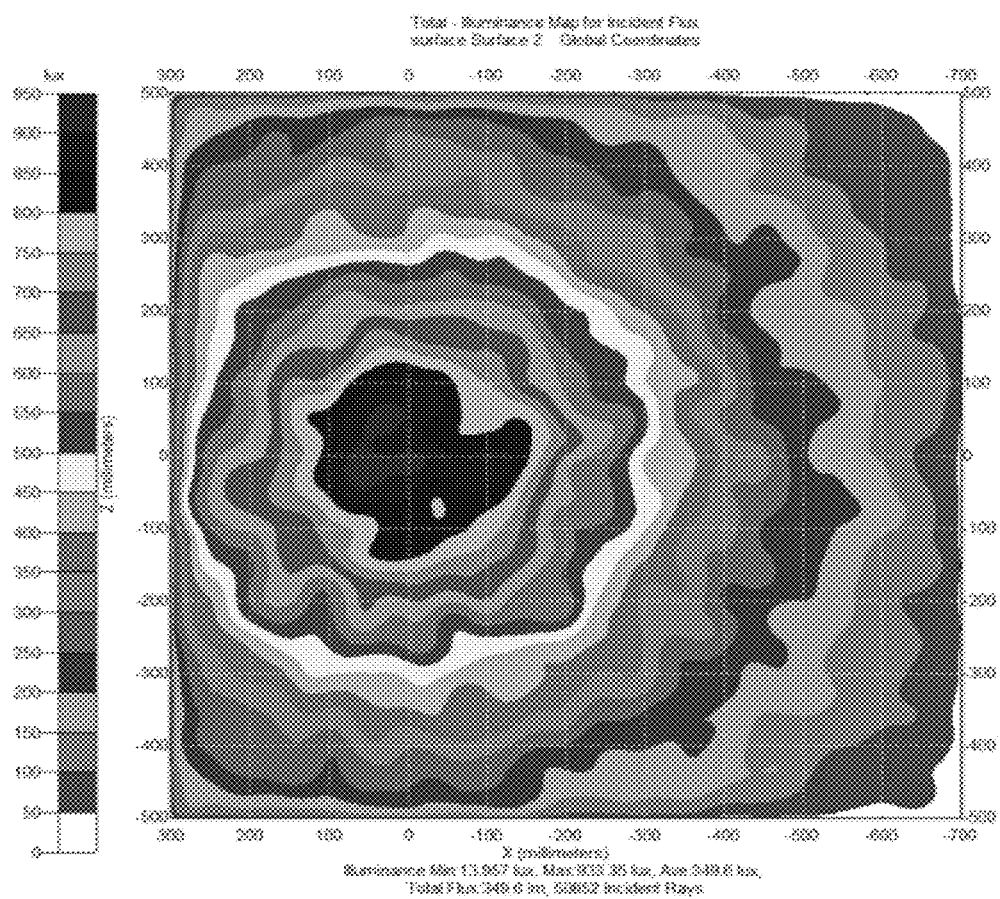
FIG. 14 is an operational diagram of a distribution of the light intensity of a lamp head of the table lamp in FIG. 12.
Figure 15A:
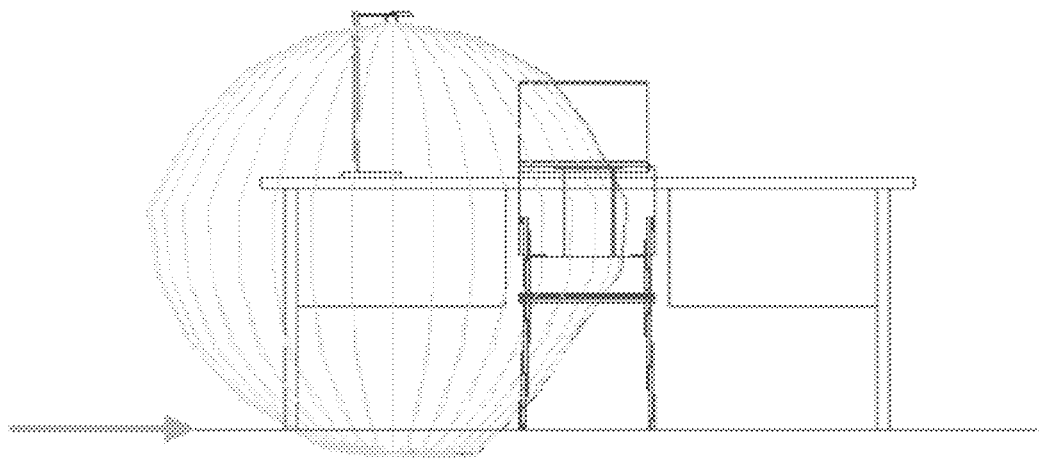
FIGS. 15A, 15B and 15C are operational diagrams of a light projection state of a lamp head of the table lamp in FIG. 12.
Figure 15B:
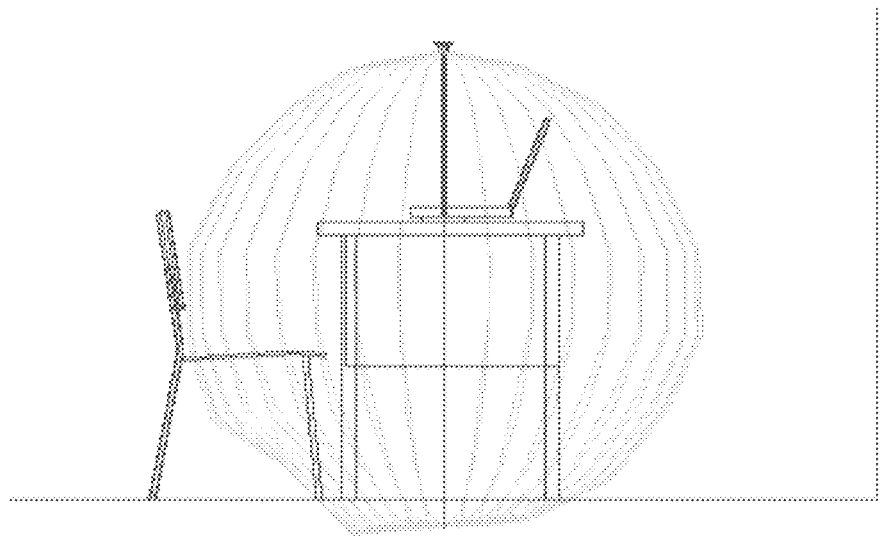
Figure 15C:
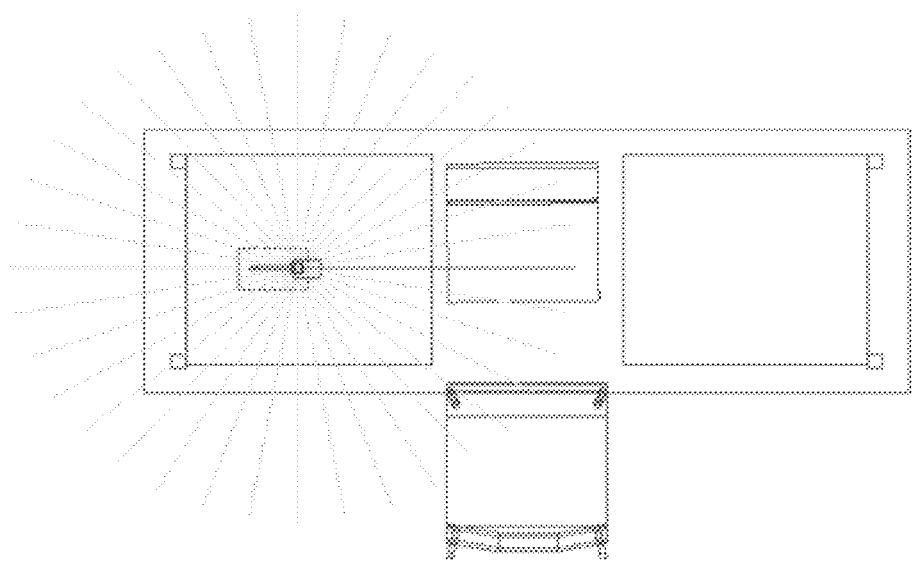
Figure 16:
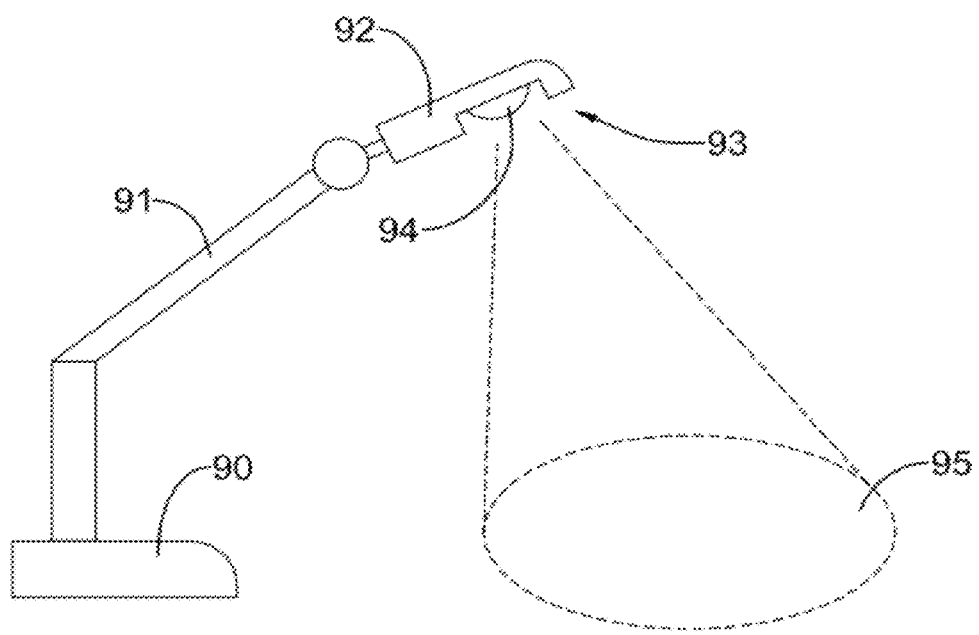
FIG. 16 is an operational side view of the table lamp in FIG. 12.

With reference to FIGS. 11A, 11B and 11C, the target zone 50 formed by the light 51 of the lamp head 40 on a table is not perpendicular to the lamp head 40, moves away from the lamp stand 20 and close to a reader. In addition, with reference to FIG. 6, the light entering concave face 12, the total reflection face 14 and the light ejecting convex face 15 are symmetrized on the zero axis 11, and this can enable the light 51 of the luminous element 41 to emit out of the body 10 of the anti-glare lens symmetrically. Additionally, the light entering concave face 12, the total reflection face 14 and the light ejecting convex face 15 are not perpendicular to the zero axis 11 of the body 10 and this can enable the light 51 to obliquely emit out of the body 10 of the anti-glare lens via the light ejecting convex face 15 of the body 10.

Consequently, the anti-glare lens and the table lamp with the anti-glare lens as described have the following advantages.

1. The total reflection face 14 of the body can totally reflect the light 51 to increase the illuminance of the luminous element 41 and adjust the emitting direction of the light 51.

2. The light entering concave face 12 and the light ejecting convex face 15 of the anti-glare lens can adjust the emitting direction of the light 51, and the center of curvature 60 of the light ejecting convex face 15 is set out of the light source region 13, close to the rear end of the body 10 and is not overlapped with the light 51 of the luminous element 41. Then, the anti-glare lens can form anti-symmetric distribution of light intensity and illuminance on a table when the lamp head 40 is adjusted to a horizontal position and this can enable the light 51 of the luminous element 41 to obliquely emit on the table. Then, the reader does not need to adjust the lamp head 40 to move close to the reader or adjust the angle of the lamp head 40 and can read clearly.

3. The anti-glare lens in accordance with the present invention can increase the illuminance of the luminous element 41, can reduce the glare and prevent the reader's eyes from tiring. In addition, the anti-glare lens also can prevent the table lamp from forming shadow and can improve the utilization rate of light 51 of the luminous element 41.

Even though numerous characteristics and advantages of the present utility model have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An anti-glare lens having a body, and the body having
   a bottom being flat and having a zero axis to divide the bottom of the body equally;
   a front end;
   a rear end;
   a light entering concave face formed in the body via the bottom of the body;
   a light source region formed in the body between the light entering concave face and the bottom of the body;
   a total reflection face obliquely formed on and protruding from the rear end of the body and formed with the bottom of the body;
   an angle between the zero axis of the bottom of the body and the total reflection face being between 90 and 180 degrees; and
   a light ejecting convex face formed from the rear end to the front end of the body, formed with the total reflection face and having at least one curvature.

2. The anti-glare lens as claimed in claim 1, wherein each one of the at least one curvature of the light ejecting convex face has a center of curvature set out of the light source region and close to the rear end of the body.

3. The anti-glare lens as claimed in claim 2, wherein the light entering concave face, the total reflection face and the light ejecting convex face are divided equally by the zero axis of the bottom of the body.

4. The anti-glare lens as claimed in claim 3, wherein the center of curvature of each one of the at least one curvature is close to the rear end of the body.

5. The anti-glare lens as claimed in claim 1, wherein the light entering concave face, the total reflection face and the light ejecting convex face are divided equally by the zero axis of the bottom of the body.

6. A table lamp with an anti-glare lens having
a lamp stand having a top;
an adjusting arm connected to the lamp stand and having
  a lower end connected to the top of the lamp stand; and
  an upper end;
a lamp head connected to the upper end of the adjusting arm and having
  an inner surface; and
  a luminous element mounted on the inner surface of the lamp head and emitting a light; and
an anti-glare lens mounted on the lamp head and having
  a body mounted on the inner surface of the lamp head and having
    a bottom being flat, mounted on the inner surface of the lamp head and having a zero axis to divide the bottom of the body equally;
    a front end;
    a rear end;
    a light entering concave face formed in the body via the bottom of the body;
    a light source region formed in the body between the light entering concave face and the bottom of the body and mounted around the luminous element of the lamp head;
    a total reflection face obliquely formed on and protruding from the rear end of the body and formed with the bottom of the body;
    an angle between the zero axis of the bottom of the body and the total reflection face being between 90 and 180 degrees; and
    a light ejecting convex face formed from the rear end to the front end of the body, formed with the total reflection face and having at least one curvature.

7. The table lamp as claimed in claim 6, wherein each one of the at least one curvature of the light ejecting convex face has a center of curvature set out of the light source region and close to the rear end of the body.

8. The table lamp as claimed in claim 7, wherein the light entering concave face, the total reflection face and the light ejecting convex face are divided equally by the zero axis of the bottom of the body.

9. The table lamp as claimed in claim 8, wherein the center of curvature of each one of the at least one curvature is close to the rear end of the body.

10. The table lamp as claimed in claim 9, wherein the luminous element is a light-emitting diode.

11. The table lamp as claimed in claim 6, wherein the light entering concave face, the total reflection face and the light ejecting convex face are divided equally by the zero axis of the bottom of the body.

* * * * *